United States Patent [19]

Hepburn

[11] Patent Number: 4,927,041
[45] Date of Patent: May 22, 1990

[54] SELF-STABILIZING FLOATING COOLER

[76] Inventor: Michael J. Hepburn, 5806 Old Lodge Dr., Houston, Tex. 77066

[21] Appl. No.: 220,072

[22] Filed: Jul. 15, 1988

[51] Int. Cl.⁵ .................... B65D 1/24; A01K 97/00
[52] U.S. Cl. ............................. 220/20; 43/54.1
[58] Field of Search .............. 220/20; 43/55, 54.1, 43/56

[56] References Cited

U.S. PATENT DOCUMENTS

| | | | |
|---|---|---|---|
| 3,148,476 | 9/1964 | Ethridge | 43/55 |
| 3,304,645 | 2/1967 | Hardesty et al. | 43/55 |
| 3,596,394 | 8/1971 | Reeder | 43/55 |
| 4,638,593 | 1/1987 | Garcia | 43/54.1 |
| 4,671,008 | 6/1987 | Lindemood | 43/56 |

*Primary Examiner*—A. Michael Chambers
*Attorney, Agent, or Firm*—Bernard A. Reiter

[57] ABSTRACT

A self-stabilizing floating cooler. The cooler includes a pair of upstanding, opposed end panels and elongated side panels extending therebetween to form a contiguous wall. A lid and a bottom panel are provided, and a floor panel is disposed between the lid and the bottom panel to define upper and lower compartments. The upper compartment is thermally insulated, and float members are detachably affixed to the side panels adjacent the floor panel exteriorly thereof. Perforations are provided in the lower compartment for filling the lower compartment with water to buoyantly stabilize the cooler in an upright position when the cooler is placed on water. Perforations also permit draining the water from the lower compartment when the cooler is removed from water.

27 Claims, 3 Drawing Sheets

SELF-STABILIZING FLOATING COOLER

1. FIELD OF THE INVENTION

The present invention relates to coolers or ice chests which float on the surface of water, and more particularly to such coolers which are self-stabilizing to be maintained in an upright floating position.

2. BACKGROUND OF THE INVENTION

The use of personal floatation devices such as inflatable life rafts or surning rafts is a popular recreational pastime. In conjunction with the use thereof, it is frequently desired to carry provisions for food or drink maintained at a temperature below or above ambient. It is known to use insulated coolers that are removably attached to the raft or other floatation device. However, coolers heretofore known are generally unstable in the water. Such coolers will frequently take on water, particularly in rough water, which leaks into the interior of the cooler, and may even tip over and lose their contents.

Accordingly, there is a need for a floating cooler which is self-stabilizing even in rough water and which retains its contents in an upright position while maintaining a cool interior temperature.

3. SUMMARY OF THE INVENTION

The present invention provides a floating cooler which is self-stabilizing to inhibit listing and tipping over. The cooler of the present invention retains its contents in a relative upright position while maintaining an interior temperature which is cooler or warmer than ambient.

In its broadest aspect, the invention provides a self-stabilizing floating cooler. The cooler has a floor and a contiguous wall extending vertically therefrom made of an insulated material to define a storage cavity. A chamber is formed beneath the floor containing perforations for allowing the passage of water and air therethrough. The chamber fills with water when the cooler is placed therein to stabilize flotation thereof. The chamber is drainable of water when the cooler is removed therefrom. The cooler further includes flotation means mounted on the wall. To enhance stability, the chamber preferably has a depth that is at least one third as that of the cavity, and especially one half. A lid may be provided for engaging an upper end of the wall to enclose the cavity. The wall is preferably rectangular and includes a pair of opposed end sections and a pair of opposed, elongated sides. The floatation means desirably includes first and second elongated float members attached to the sides. The float members are preferably removably attached to the sides, e.g. with pressure sensitive adhering synthetic material such as VELCRO adhesive strips. The float members may be hollow, or constructed of a buoyant material such as, for example, cork, foamed plastic such as polystyrene, polyvinylchloride, and the like. The lid is preferably sealingly engageable with the upper end of the wall to form an essentially water tight closure therewith.

In another aspect the invention provides a self-stabilizing floating cooler. The cooler includes a pair of upstanding opposed end panels, and a pair of upstanding, opposed, elongated side panels extending therebetween to form a contiguous wall therewith. A lid is provided for engaging upper ends of the panels, at least a portion of the lid being removable. A bottom panel extends between the end and side panels and a floor extends between the end and side panels to define therewith an upper storage compartment disposed between the floor panel and the lid. A lower compartment is disposed between the floor panel and the bottom panel. The lower compartment has a depth at least one third as that of the upper compartment and especially one half. Means are provided for thermally insulating the upper compartment. Float members are detachably affixed to the side panels adjacent the floor panel exteriorly thereof. Means are also provided for filling the lower compartment with water to maintain the cooler in an upright position when the cooler is placed in water. The filling means also serves as draining means to drain the water from the lower compartment when the cooler is removed from the water. The insulating means preferably includes insulated material constituting, or affixed to at least the floor panel and the end and side panels between the floor panel and the lid. The lid, the floor panel, and the end and side panels therebetween may include a thermally insulated material. The lid is preferably hinged between the and panels. The filling and draining means preferably includes perforations in the end and/or side panels disposed between the floor panel and the bottom panel. Preferably, the bottom panel is also perforated. The cooler may further include means disposed in the upper compartment for restraining movement of items placed therein, and especially to maintain the items spaced away from the side panels. The restraining means may be bumpers disposed adjacent the side panels, especially disposed adjacent the floor and side panels for maintaining beverage cans along a longitudinal centerline of the compartment.

4. BRIEF DESCRIPTION OF THE DRAWINGS

5. DETAILED DESCRIPTION OF THE PREFERRED EMBODIMENTS

Figures 1, 2:
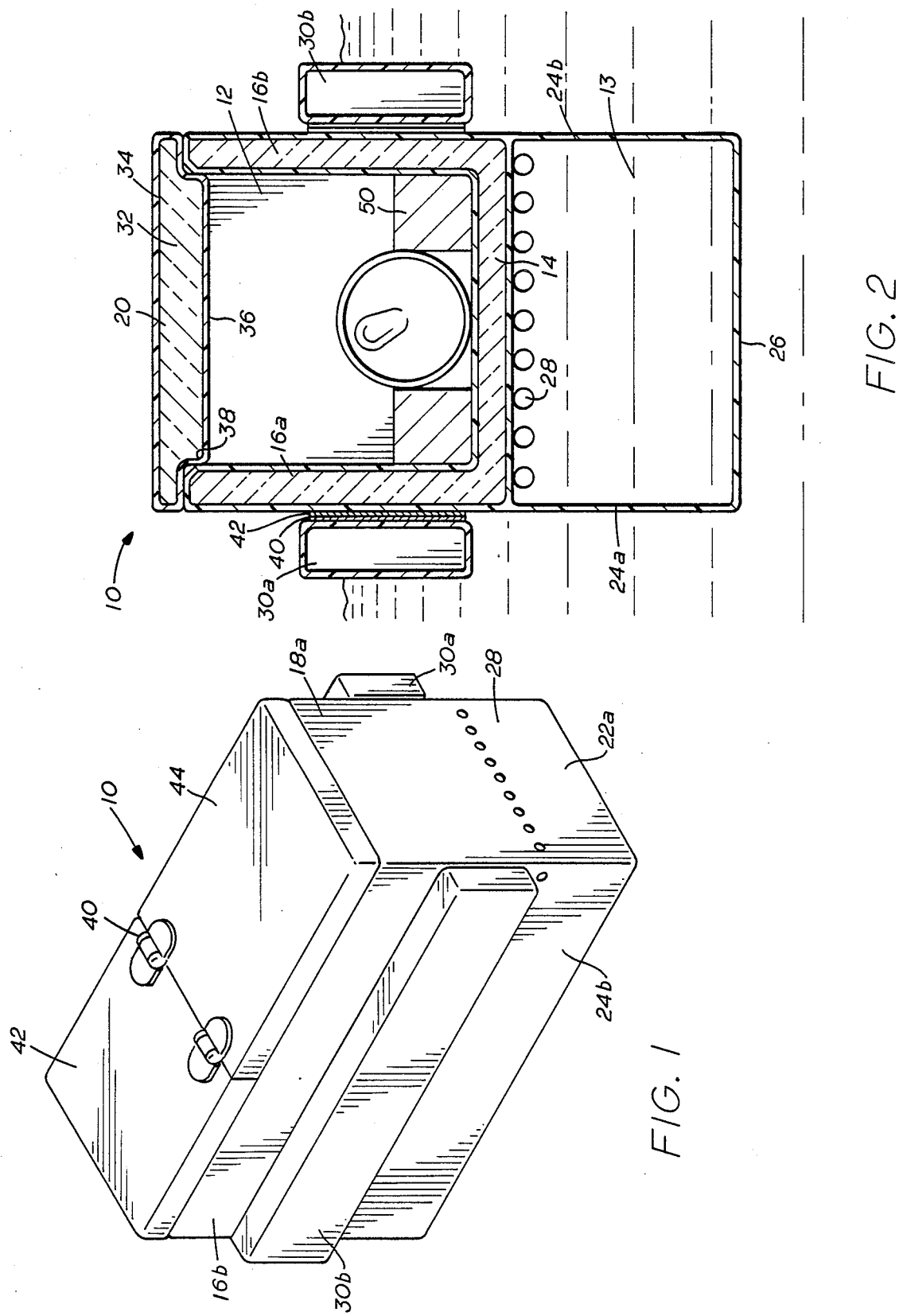
FIG. 1 is a perspective view of a floating cooler according to the present invention.
FIG. 2 is a cross-sectional view of the cooler seen in FIG. 1 floating in the water.

Referring now to the figures wherein like parts are indicated by like reference numerals, the cooler 10 has an upper compartment 12 and a lower compartment 13. The upper compartment 12 has a floor 14, opposed longitudinal sides 16a,16b and opposed ends 18a,18b. The ends 18a,18b and the sides 16a,16b form a contiguous wall extending vertically upward from the floor 14. The upper compartment 12 is sealed at the upper ends of this wall by lid 20. The floor 14, the sides 16a,16b, the ends 18a,18b and the lid 20 are insulated to provide thermal retention in the sealed compartment 12 for the storage of items desired to be kept above or below the ambient temperature.

The lower compartment 13 extends below the floor 14 and is defined by opposed ends 22a,22b, opposed elongated sides 24a,24b, and bottom panel 26. The side walls 24a,24b and/or the ends 22a,22b contain perforations 28 adjacent the floor 14 for the influx and draining of water from the compartment 13. If desired, perforations 28 could alternatively or additionally be provided in bottom panel 26. Floatation means 30a,30b are affixed to the sides 16a,16b respectively.

An important aspect of the present invention is that the floor 14 is positioned between the lid 20 and the bottom panel 26 such that the depth of the lower compartment 13 is sufficient to assist in maintaining the cooler 10 in an upright position when the lower chamber 13 is filled with water, and the depth thereof is preferably one third to one half or more of the depth of the upper compartment. When the cooler 10 is placed in water, the lower compartment 13 fills with water which enters through the perforations 28 which perforations also allow for the exit of air displaced by the entering water. Filling of the lower compartment 13 with water provides thus a weighting of the lower portion of the cooler 10 and stability in the water. Generally, the larger the volume of the compartment 13 relative to that of the compartment 12, more stability of the cooler 10 when floating in the water. The perforations 28, or other suitable means for allowing entry and drainage of water between the compartment 13 and exterior of the cooler 10, should be sized and provided is number sufficient to permit entry of the water into the compartment 13, and conversely, drainage of the water from the compartment 13 when the cooler is removed from the water. On the other hand, the perforations 28 should be sized and numbered such that water from chamber 13 is not too rapidly drained therefrom else the stabilizing effect of the water-filled chamber 13 will not be realized. The cooler 10 is made more readily portable by removing the weight of the water from cavity 13 by drainage thereof through perforations 28.

If desired, a door or a port, or other similar means, may also be formed in one of the ends 22a,22b or the sides 24a,24b of the lower compartment 13 for the introduction into and removal from the lower compartment 13 of live bait or other objects desired to be submerged in water.

The insulated structural members of the cooler 10, the floor 14, the ends 16a,16b, the sides 18a,18b and the lid 20 may conveniently be constructed to include a core material 32 sandwiched between and exterior panel 34 and an interior panel 36 as best seen in FIG. 2. In this embodiment, the interior panel material 32 may be an insulative material such as cork, one or more foamed plastics, e.g. polystyrene, polyvinylchloride, polyurethane, etc. It is preferred that the insulative material 32 also be buoyant to assist in floatation of the cooler 10. The external panel 34 and the internal panel 36 serve to protect the core material 32 from the water, and the exterior and interior panels 34,36 may be constructed of any structurally rigid material which is impervious to water, such as, for example, polystyrene, polypropylene, polyethylene, and the like.

The length of the side panels 16a,16b is preferably relatively greater than the width of the end panels 18a,18b. It has been found that when the length of the side panels 18a,18b is at least three to four times as great as the width of the end panels 18a,18b, the stability of the cooler 10 is enhanced. Generally, the greater the length of the cooler 10 relative to its width, the better the floatation stability of the cooler 10.

The lid 20 desirably is securely affixed to the cooler 10 at the upper ends of the end panel 18a,18b and the side panels 16a,16b. The lid 20 may be secured to the walls 16a,16b,18a,18b by latches, or by providing an inward peripheral lip 38 which is designed to fit snugly between the walls 16a,16b,18a,18b. The lid may be one continuous, rigid member, but is preferably hinged by hinges 40 as best seen in FIG. 1. The hinges 40 permit one side 42 or the other side 44 of the aid 20 to be opened while the other side remains closed. The side 42 or the side 44 may be formed integral with the adjacent sides 16a,16b and end 18a or 18b, may fit snugly as mentioned above or may be latched to the adjacent end 18aand/or 18b.

Figure 4:
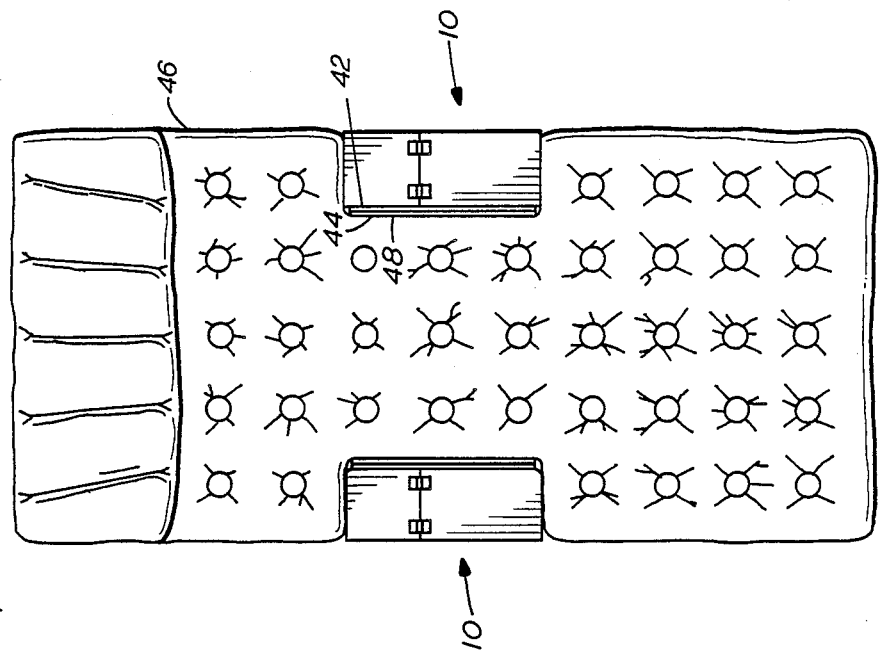
FIG. 4 is a top view of a personal raft to which the cooler of FIG. 1 is adapted to be removably attached.
Figure 3:
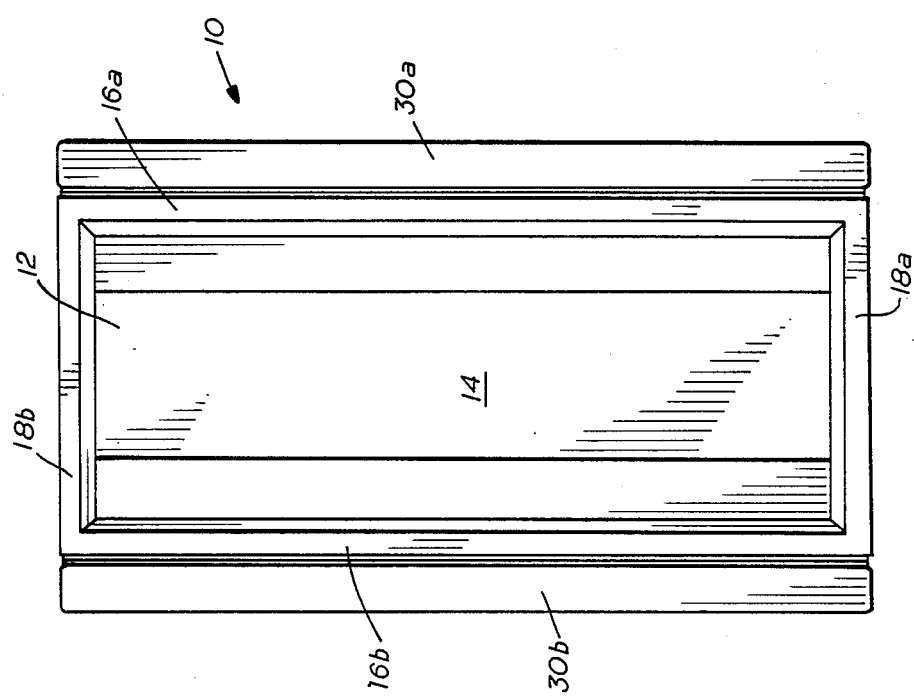
FIG. 3 is a top view of the cooler of FIG. 1.

The floatation members 30a,30b provide buoyancy along the sides 16a,16b, respectively. The floatation members 30a,30b may be pontoons, i.e. hollow members, or may be manufactured of a buoyant material such as a foamed plastic or cork. The floatation members 30a,30b are preferably detachably affixed to the respective sides 16a,16b, for example, by providing VELCRO adhesive strips 40,42 attached to the floatation device 30a and 30b and the side 16a,16b, respectively. In this manner, the cooler 10 may be made attachable to a life raft 36 having a recess 44 formed in the contour thereof for receiving the cooler 10 at a similar VELCRO adhesive strip 48 which mates with the VELCRO adhesive strip 42 of the cooler 10, as best illustrated in FIG. 4.

The cooler 10 may be constructed by conventional techniques in the art. For example, the upper compartment 12 may be made by manufacturing the walls 16a,16b, the ends 18a,18b, and the floor 14 in one molding operation, by forming the lower cavity 13, i.e. the walls 24a,24b,22a,22b and the bottom panel 26, in another molding operation, and then attaching the bottom section to the top section with adhesives, thermal fusion, or the like. Alternatively, for example, the exterior shell of the cooler 10, i.e. the walls 16a,16b,18a,18b,-22a,22b,24a,24b and the bottom 26 may be formed from one mold and the remaining elements affixed thereto, e.g. by placing the floor member 14 and insulated material in place in the shell.

In another preferred embodiment, bumpers 50 are provided adjacent the sides 16a,16b. The bumpers 50 serve to maintain items placed in the upper compartment 12 along a longitudinal centerline thereof, spaced away from the walls 16a,16b. This serves to further enhance the stability of the device by inhibiting shifting of the contents from one side to the other. In a particularly preferred embodiment the space between the bumpers 50 is sufficient to accommodate a beverage container such as a can or bottle 52 as illustrated in FIG. 2. Alternatively, vertical partitions may be provided in the compartment 12 for this purpose.

In using the cooler 10, the contents in the compartment 12 will be warmer or cooler than ambient temperature as desired. Where a cooler than ambient temperature is desired for the contents of the compartment 12, ice or other coolant material may be added thereto as is conventional in the ice chest art. The cooler 10 is generally filled with the desired items placed in the compartment 12, and subsequently placed in the water. Initially, the cooler 10 may list to one side or the other until the lower compartment 13 fills with water and stabilizes the cooler in an upright position, assisted by the floatation members 30a,30b. The device may further be attached to a personal floatation device as described hereinabove, allowed to float freely, or tethered to an anchor, or person, or another floating or fixed object in or adjacent the water.

Figure 6:
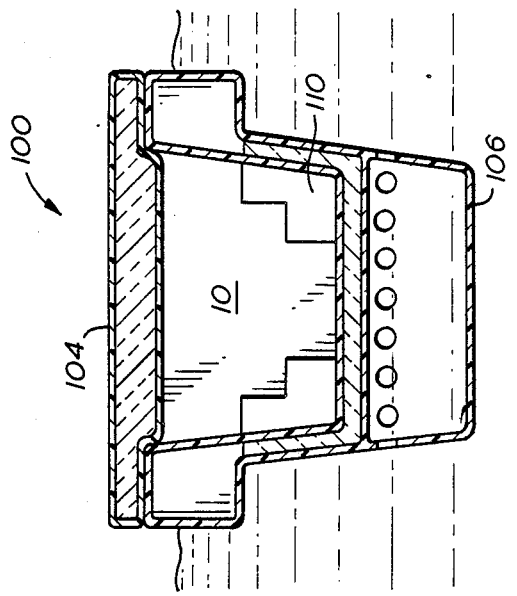
FIG. 6 is a cross-sectional view of the cooler of FIG. 5.
Figure 5:
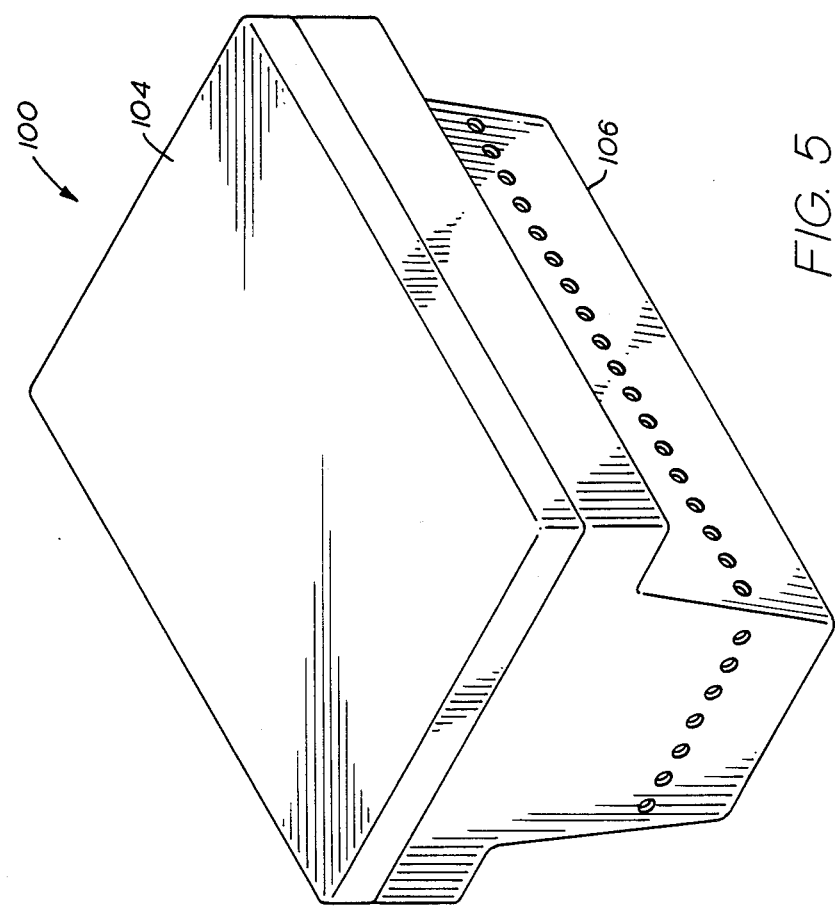
FIG. 5 is a perspective view of another embodiment of a floating cooler according to the present invention.

In an alternate embodiment illustrated in FIGS. 5 and 6, the cooler 100 is constructed similarly to the cooler 10 illustrated in FIGS. 1–4. In this embodiment, however, the sidewalls 102 taper inwardly from the top 104 toward the bottom 106. The floatation members 108 are formed integral with the wall 102 and extend longitudinally on either side of the cooler 100. The bumpers 110 are vertically stepped to form a relatively narrow longitudinal changed at a lower portion thereof. and a relatively wider longitudinal channel towards the upper portion thereof. This design of the cooler 100 is adapted for relatively larger coolers than the embodiment described in reference to FIGS. 1–4. The tapered walls 102 and the peripherally positioned float members 108 serve to provide additional buoyancy and stability as the bulk and weight of the contents in upper compartment 112 of the cooler 100 increase. In addition, the bumpers 110 function to assist a more central longitudinal disposition of the contents in the compartment 112 for greater stability whirl, floating in the water.

Having described the invention above by way of illustration, various modifications in the size, shape, materials, methods of construction and use will occur to those skilled in the art. It is intended that all such variations which fall within the scope and spirit of the appended claims be embraced thereby.

What is claimed is:

1. A self-stabilizing floating cooler, comprising:
   a floor and contiguous wall extending vertically therefrom made of an insulated material to define a storage cavity;
   a chamber for containing water formed beneath said floor, said chamber having perforations substantially adjacent said floor for allowing the passage of water and air therethrough, wherein the chamber fills with water when the cooler is placed therein to stabilize floatation thereof wherein said chamber has a depth at least one third that of said storage cavity and wherein the chamber is drainable of water when the cooler is removed therefrom; and floatation means mounted on said wall.

2. The cooler of claim 1 wherein the chamber has a depth at least as great as that of said cavity.

3. The cooler of claim 1, further comprising a lid for engaging an upper end of said wall to enclose said cavity.

4. The cooler of claim 1, wherein said wall is rectangular and includes a pair of opposed end sections and a pair of opposed, elongated sides.

5. The cooler of claim 4, wherein the floatation means include a first and second elongated float members attached to said sides.

6. The cooler of claim 5, wherein the float members are removably attached.

7. The cooler of claim 6, wherein the float members are removably attached with pressure sensitive adhering synthetic strips.

8. The cooler of claim 5, wherein the float members are hollow.

9. The cooler of claim 5, wherein the float members are constructed of buoyant material.

10. The cooler of claim 3, wherein the lid is sealingly engageable with the upper end of the wall to form an essentially water-tight closure therewith.

11. The cooler of claim 5, wherein the sides are slanted inwardly from an upper end of the wall toward the floor.

12. The cooler of claim 11, wherein the float members are affixed adjacent the upper ends of the sides.

13. The cooler of claim 12, wherein the float members are fixedly attached.

14. The cooler of claim 1, wherein the chamber includes means for introducing live bait thereinto and removing the live bait therefrom.

15. A self-stabilizing floating cooler, comprising:
   a pair of upstanding, opposed end panels;
   upstanding, opposed elongated side panels extending between said end panels to form a contiguous wall therewith;
   a lid for engaging upper ends of said panels, at least a portion of said lid being removable;
   a bottom panel extending between said end and side panels;
   a floor panel extending between said end and side panels to define therewith an upper storage compartment disposed between said floor panel and said lid, and a lower compartment disposed between said floor panel and said bottom panel, wherein said lower compartment has a depth at least one third that of said upper compartment;
   means for thermally insulating said upper compartment;
   floating members affixed to said side panels adjacent said floor panel exteriorly thereof; and
   means for filling said lower compartment with water to buoyantly stabilize the cooler in an upright position when the cooler is placed in water, and for draining said water from said lower compartment when the cooler removed from water.

16. The cooler of claim 15, wherein said insulating means includes an insulative material constituting or affixed to at least said floor panel and said end and side panels between said floor panel and said lid.

17. The cooler of claim 15, wherein said lid, said floor panel, and said end and side panels therebetween include a thermally insulative material.

18. The cooler of claim 15, wherein the lid is hinged between said end panels.

19. The cooler of claim 15, wherein said filling and draining means includes perforations in said end and/or said side panels disposed between said floor panel and said bottom panel.

20. The cooler of claim 19, wherein said bottom panel is perforated.

21. The cooler of claim 15, further including means disposed in said upper compartment for restraining movement of items placed therein.

22. The cooler of claim 21, wherein said restraining means maintains said items spaced away from said side panels.

23. The cooler of claim 22 wherein said restraining means includes bumpers disposed adjacent said side panels.

24. The cooler of claim 15, further comprising opposed longitudinal bumpers disposed adjacent said floor and said side panels for maintaining horizontally disposed beverage car's or bottles along the longitudinal center line of said upper compartment.

25. A self-stabilizing cooler comprising:
   a floor and a contiguous wall extending vertically therefrom made of an insulating material to define a storage cavity;
   a lid for engaging said contiguous wall opposite said floor;
   float members affixed to said contiguous wall;

a chamber for containing water formed beneath said floor, said chamber having perforations substantially adjacent said floor for allowing the passage of water and air therethrough, wherein said chamber fills with water when the cooler is placed in water to stabilize flotation thereof, and wherein said chamber is drainable of water when the cooler is removed from water.

26. A self-stabilizing floating cooler as recited in claim 25 wherein said float members are attachable to and detachable from said contiguous wall.

27. A self-stabilizing cooler comprising:
a floor and a contiguous wall extending vertically therefrom made of an insulating material to define a storage cavity;
a lid for engaging said contiguous wall opposite said floor;
float members affixed to said contiguous wall;
a ballast containing chamber formed beneath said floor;
means for filling and draining said ballast containing chamber.

* * * * *